United States Patent
Jones

(10) Patent No.: US 7,507,070 B2
(45) Date of Patent: *Mar. 24, 2009

(54) GAS TURBINE ENGINE AND A ROTOR FOR A GAS TURBINE ENGINE

(75) Inventor: Alan R Jones, Derby (GB)

(73) Assignee: Rolls-Royce plc, London (GB)

( * ) Notice: Subject to any disclaimer, the term of this patent is extended or adjusted under 35 U.S.C. 154(b) by 339 days.

This patent is subject to a terminal disclaimer.

(21) Appl. No.: 11/188,092

(22) Filed: Jul. 25, 2005

(65) Prior Publication Data

US 2007/0031249 A1 Feb. 8, 2007

Related U.S. Application Data

(60) Continuation of application No. 10/387,528, filed on Mar. 14, 2003, now abandoned, which is a division of application No. 09/531,960, filed on Mar. 21, 2000, now Pat. No. 6,575,699.

(30) Foreign Application Priority Data

Mar. 27, 1999 (GB) ................................. 9907045.0

(51) Int. Cl.
 *F01D 5/08* (2006.01)

(52) U.S. Cl. .................. 415/200; 415/176; 415/177; 415/178; 416/241 R; 416/244 A

(58) Field of Classification Search ................. 415/200, 415/216.1, 176–178; 416/241 R, 241 A, 416/229 A, 244 R, 244 A
See application file for complete search history.

(56) References Cited

U.S. PATENT DOCUMENTS

| 2,479,046 A | * | 8/1949 | Ledwith | 415/117 |
| 2,655,308 A | * | 10/1953 | Luttman | 415/177 |
| 2,659,530 A | * | 11/1953 | Garnier et al. | 416/171 |
| 3,339,933 A | * | 9/1967 | Foster | 277/415 |
| 4,277,222 A | * | 7/1981 | Barbeau | 415/177 |
| 4,642,027 A | * | 2/1987 | Popp | 415/177 |
| 6,089,821 A | * | 7/2000 | Maguire et al. | 415/115 |
| 6,575,699 B1 | * | 6/2003 | Jones | 415/200 |

* cited by examiner

*Primary Examiner*—Christopher Verdier
(74) *Attorney, Agent, or Firm*—W. Warren Taltavull; Manelli Denison & Selter PLLC

(57) ABSTRACT

A rotor (38) for a gas turbine engine (10) has a low emissivity surface finish, or high emissivity surface finish (44), on at least a portion of its surface (42) to reduce temperature differentials between an upper portion and a lower portion of the rotor (38). This reduces bowing of the rotor (38) to allow the gas turbine engine (10) to be started without harmful vibrations of the rotor (38).

4 Claims, 4 Drawing Sheets

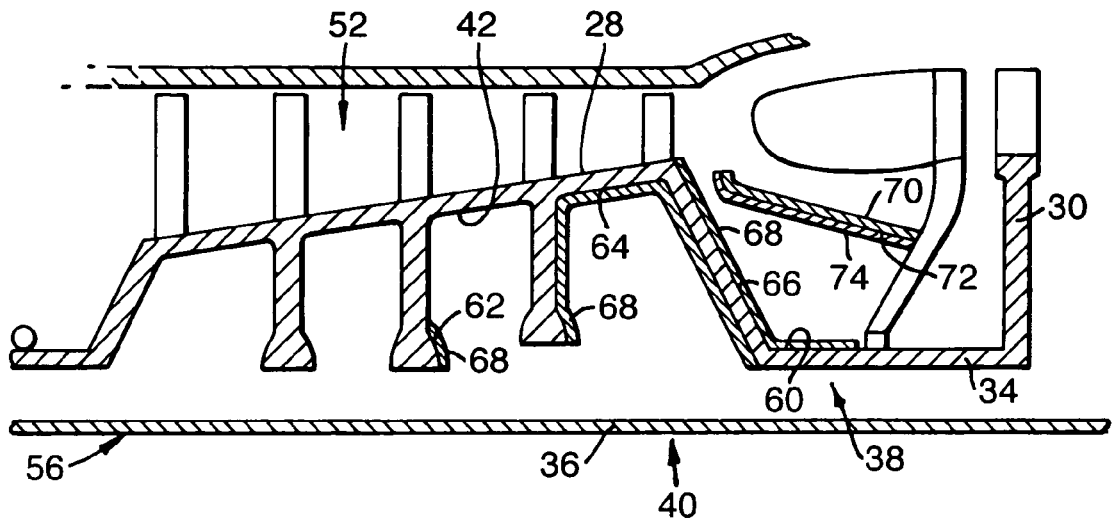
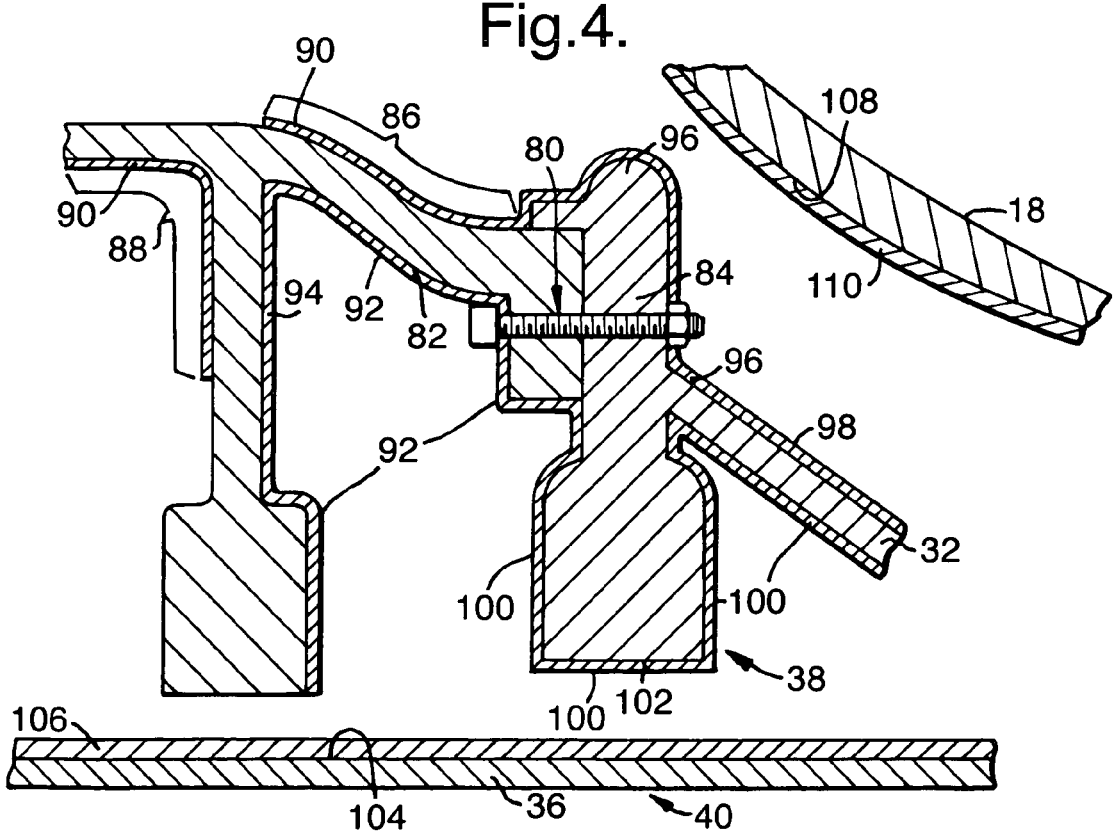

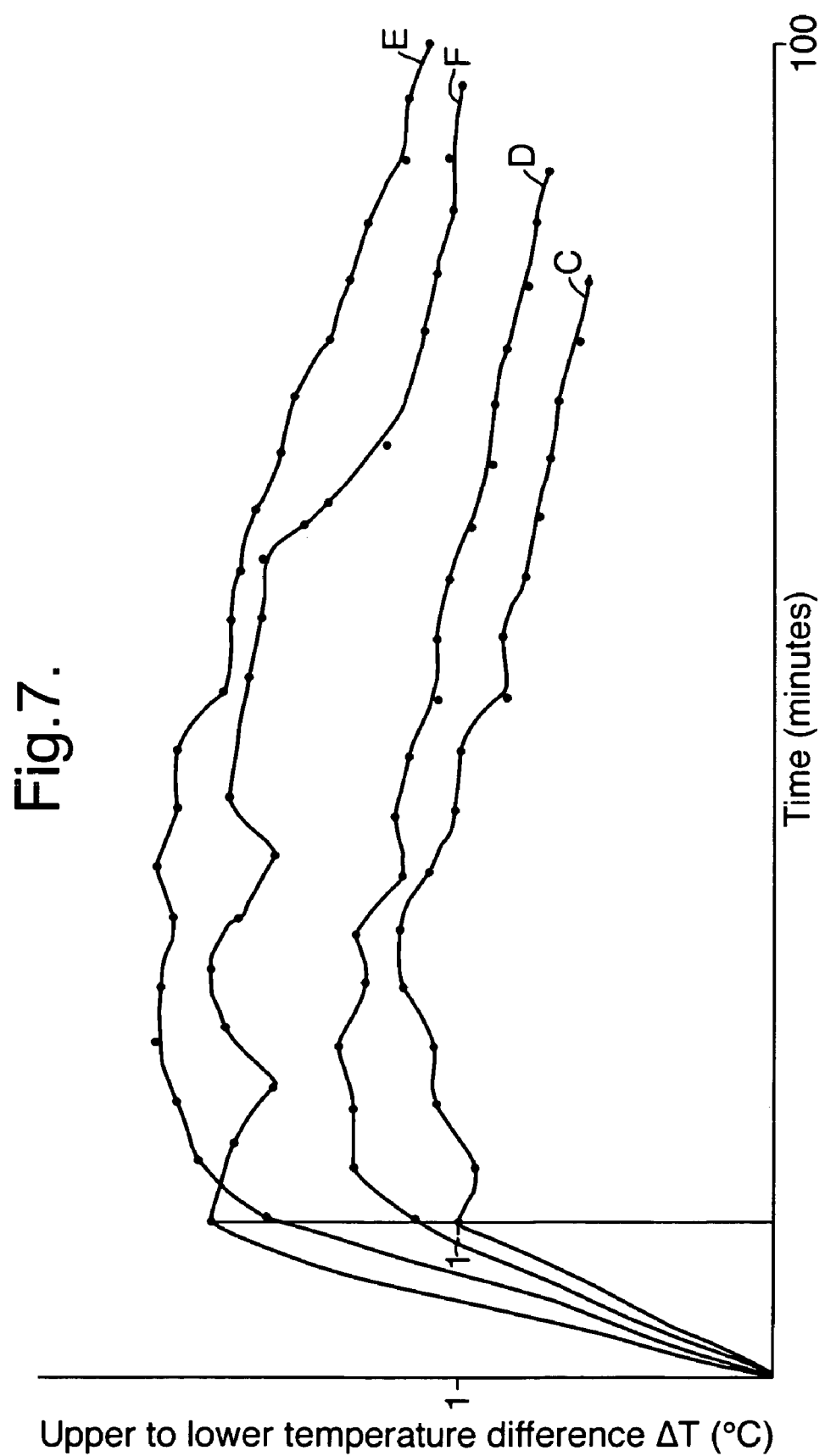

GAS TURBINE ENGINE AND A ROTOR FOR A GAS TURBINE ENGINE

This application is a Continuation application of U.S. Ser. No. 10/387,528 filed Mar. 14, 2003 now abandoned which is a Divisional application of Ser. No. 09/531,960 filed Mar. 21, 2000, now U.S. Pat. No. 6,575,699 issued Jun. 10, 2003.

FIELD OF THE INVENTION

The present invention relates to gas turbine engines, particularly aero gas turbine engines.

One problem with gas turbine engines is the thermal distortion which occurs when a gas turbine engine is shut down after use. The residual heat in the various components of the gas turbine engine causes convection currents to be set up which cause the upper portions of the gas turbine engine to retain their heat for longer than the lower portions of the gas turbine engine. This produces a temperature differential which in turn causes differential thermal expansion.

BACKGROUND OF THE INVENTION

The effect of the differential thermal expansion is to cause at least the rotors, particularly the high pressure rotor, to bow upwardly. The amount of rotor bow is time dependent. For a given heat content within the gas turbine engine, the maximum rotor bow will occur some time after shut down, when the convective heat transfer has had time to act, but before the gas turbine engine has cooled down. The magnitude of the temperature differential between the upper portion and the lower portion of the gas turbine engine and the magnitude of the rotor bow depends on the heat content of the gas turbine engine, so that when the gas turbine engine has cooled down the temperature differential and rotor bow disappear.

The distortion, or bowing, of the rotor in itself is not harmful to the gas turbine engine. However, if it is desired to restart the gas turbine engine while the rotor of the gas turbine engine is distorted, or bowed, due to the differential thermal expansion the displacement of the centre of mass of the distorted rotor from the centre of rotation may create problems.

The first problem is large, damaging vibrations of the rotor and possibly rubbing of the rotor with the surrounding stator when the rotor passes through its first critical speed because the rotor of the gas turbine engine is distorted, or bowed, due to the differential thermal expansion. It is normal practice to arrange for the first critical speed of the rotor to be less than the idle speed. The rotor typically comprises two portions which are connected by a spigotted, bolted, joint. As the rotor cools down the spigotted, bolted, joint may become loose due to the differential thermal expansion and hence the vibrations of the rotor may produce wear at the spigotted, bolted, joints. The worn spigotted, bolted, joints exacerbate the vibrational response of the gas turbine engine rotor to rotor bowing.

The second problem is additional stresses are produced in the rotor when the rotor reaches high speed operation after start up if the rotor of the gas turbine engine is distorted, or bowed, due to the differential thermal expansion. The gas turbine engine may be started from a cooling condition and accelerated to idle speed and then to high speed before the rotor has warmed through to a uniform temperature circumferentially around the rotor. This is because of the high thermal inertia of the rotor discs and drums. The effect of the rotor bow is to superimpose an extra stress onto the high stress levels in the rotor, thus some circumferential parts of the rotor will have an additional tensile stress and some circumferential parts will have an additional compressive stress. The result is that the expected service life of a rotor that is frequently started in a bowed condition is less than that of a rotor that is never started in a bowed condition.

UK patent application GB2117842A discloses the use of ducts and blowers to circulate warmer gas from the upper portion of the gas turbine engine to the lower portion of the gas turbine engine or circulate cooler gas from the lower portion of the gas turbine engine to the upper portion of the gas turbine engine. This requires the provision of ducts and blowers to the gas turbine engine which adds weight and cost to the gas turbine engine.

UK patent application GB2117450A discloses the use of a particular mounting arrangement for the compressor casing and heaters to differentially heat the mounting to displace the casing to compensate for the distortion of the rotor. This requires the provision of the particular mounting and heaters which adds weight and cost to the gas turbine engine and does not solve the problem of vibration of the rotor.

SUMMARY OF THE INVENTION

Accordingly the present invention seeks to provide a novel component for a gas turbine engine which overcomes the above mentioned problems.

Accordingly the present invention provides a gas turbine engine comprising at least one rotor and at least one casing arranged coaxially around the at least one rotor, at least one of the at least one rotor or the at least one casing having a low emissivity surface finish, or high emissivity surface finish, on at least a portion of its surface to reduce temperature differentials between an upper portion and a lower portion of the at least one rotor.

Preferably the gas turbine engine comprises a low pressure rotor and a high pressure rotor arranged coaxially around the low pressure rotor and at least one casing arranged coaxially around the high pressure rotor, at least one of the high pressure rotor, the low pressure rotor or the at least one casing having a low emissivity surface finish, or high emissivity surface finish, on at least a portion of its surface to reduce temperature differentials between an upper portion and a lower portion of at least one of the low pressure rotor and the high pressure rotor.

The high emissivity surface finish may be arranged on substantially the whole of the radially inner surface of the high pressure rotor. The high emissivity surface finish may be arranged on substantially the whole of the radially inner surface of the low pressure rotor. The high emissivity surface finish may be arranged on substantially the whole of the radially outer surface of the low pressure rotor.

A low emissivity surface finish may be arranged on at least a portion of the radially outer surface of the high pressure rotor and a low emissivity surface finish is arranged on a portion of the radially inner surface of the high pressure rotor.

A high emissivity surface finish may be arranged on at least a portion of the radially inner surface of the high pressure rotor, a high emissivity surface finish is arranged on at least a portion of the radially outer surface of the high pressure rotor, a low emissivity surface finish is arranged on at least a portion of the radially outer surface of the high pressure rotor and a low emissivity surface finish is arranged on at least a portion of the radially inner surface of the high pressure rotor.

The high emissivity surface finish may be arranged on at least a portion of the downstream surface of the high pressure rotor. The high emissivity surface finish may be arranged on substantially all of the downstream surface of the high pressure rotor.

The high emissivity surface finish may be arranged on at least a portion of the downstream surface of the low pressure rotor. The high emissivity surface finish may be arranged on substantially all of the downstream surface of the low pressure rotor.

The high pressure rotor may comprise a high pressure compressor and a high pressure turbine and the low pressure rotor comprises a low pressure compressor and a low pressure turbine.

The high pressure turbine may comprise at least one turbine disc and the low pressure turbine comprises at least one turbine disc.

The high emissivity surface finish may be arranged on the upstream surface of each turbine disc on the high pressure rotor and the downstream surface of each turbine disc on the high pressure rotor.

The high emissivity surface finish may be arranged on the upstream surface of each turbine disc on the low pressure rotor and the downstream surface of each turbine disc on the low pressure rotor.

The at least one casing may be arranged around the high pressure turbine and the low pressure turbine, at least a portion of the at least one casing having a high emissivity surface finish on its outer surface to increase the rate of radiation of heat from at least one of the turbines.

At least a portion of the at least one casing may have a high emissivity surface finish on its outer surface. At least a portion of the at least one casing may have a high emissivity surface finish or a low emissivity surface finish on its inner surface.

The high emissivity surface finish may comprise a coating applied to, or formed on, the surface of the at least one rotor or the at least one casing. The coating may comprise a high emissivity metal oxide, a metal oxide formed on the at least one rotor or the at least one casing due to oxidation of the at least one rotor or the at least one casing, carbon, black paint or other suitable colour paint.

The low emissivity surface finish may comprise a polished or machined portion of the surface of the at least one rotor or the at least one casing, or a coating applied to the surface of the at least one rotor or the at least one casing. The coating may comprise a polished metal coating, a polished silver coating, a polished gold coating, or a low emissivity metal oxide.

The at least one rotor may be rotatably mounted on the casing by a support structure, the support structure carrying a bearing chamber having a bearing.

The surface of the bearing chamber having a low emissivity surface finish. The upstream and downstream surfaces of the support structure having a high emissivity surface finish.

The present invention also provides a rotor for a gas turbine engine having a low emissivity surface finish, or high emissivity surface finish, on at least a portion of its surface to reduce temperature differentials between an upper portion and a lower portion of the rotor.

A high emissivity surface finish may be arranged on at least a portion of the radially inner surface of the rotor. The high emissivity surface finish may be arranged on substantially the whole of the radially inner surface of the rotor. A high emissivity surface finish may be arranged on at least a portion of the radially outer surface of the rotor. The high emissivity surface finish may be arranged on substantially the whole of the radially outer surface of the rotor.

A low emissivity surface may be arranged on at least a portion of the radially outer surface of the rotor. The low emissivity surface finish may be arranged on substantially the whole of the radially outer surface of the rotor.

A high emissivity surface finish may be arranged on at least a portion of the radially inner surface of the rotor, a high emissivity surface finish is arranged on at least a portion of the radially outer surface of the rotor, a low emissivity surface finish is arranged on at least a portion of the radially outer surface of the rotor and a low emissivity surface finish is arranged on at least a portion of the radially inner surface of the rotor.

A high emissivity surface finish may be arranged on at least a portion of the downstream surface of the rotor. The high emissivity surface finish may be arranged on substantially all of the downstream surface of the rotor.

The rotor may be a high pressure rotor, an intermediate pressure rotor or a low pressure rotor.

The high emissivity surface finish may comprise a coating applied to, or formed on, the surface of the rotor. The coating may comprise a high emissivity metal oxide, a metal oxide formed on the rotor due to oxidation of the rotor, carbon, black paint or other suitable colour paint.

The low emissivity surface finish may comprise a polished or other machined portion of the surface of the rotor or a coating applied to the surface of the rotor. The coating may comprise a polished metal coating, a polished silver coating, a polished gold coating, or a low emissivity metal oxide.

BRIEF DESCRIPTION OF THE DRAWINGS

The present invention will be more fully described by way of example with reference to the accompanying drawings in which:

FIG. 3 is an enlarged cross-sectional view through the gas turbine engine in FIG. 1 showing alternative rotors according to the present invention.

FIG. 4 is an enlarged cross-sectional view through the gas turbine engine in FIG. 1 showing further rotors according to the present invention.

FIG. 7 is a graph showing temperature difference between upper and lower portions of a rotor against time after isolation from heat source for high emissivity coated and uncoated rotors.

DETAILED DESCRIPTION OF THE INVENTION

Figure 1:
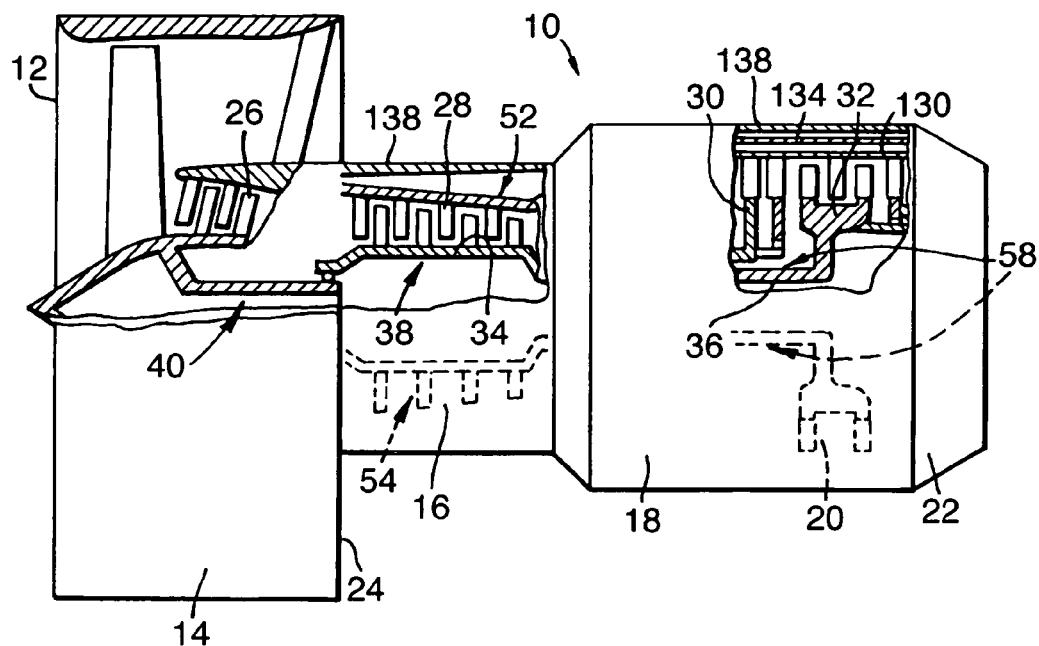
FIG. 1 shows a gas turbine engine having a rotor according to the present invention.

A turbofan gas turbine engine 10, as shown in FIG. 1, comprises an intake 12, a fan section 14, a compressor section 16, a combustion section 18, a turbine section 20 and an outlet 22. The fan section 14 has a fan outlet 24. The compressor section 16 comprises an upstream, low pressure or booster, compressor 26 and a downstream, high pressure, compressor 28. The turbine section 20 comprises an upstream, high pressure, turbine 30 and a downstream, low pressure, turbine 32. The fan section 14 and the low pressure compressor 26 are driven by the low pressure turbine 32 via a shaft 36. The high pressure compressor 28 is driven by the high pressure turbine 30 via shaft 34. The shaft 36 is coaxially arranged within shaft 34. The fan section 14, low pressure compressor 26, shaft 36 and low pressure turbine 32 form a low pressure rotor 40. The high pressure compressor 28, shaft 34 and high pressure turbine 30 form a high pressure rotor 38.

Figure 2:
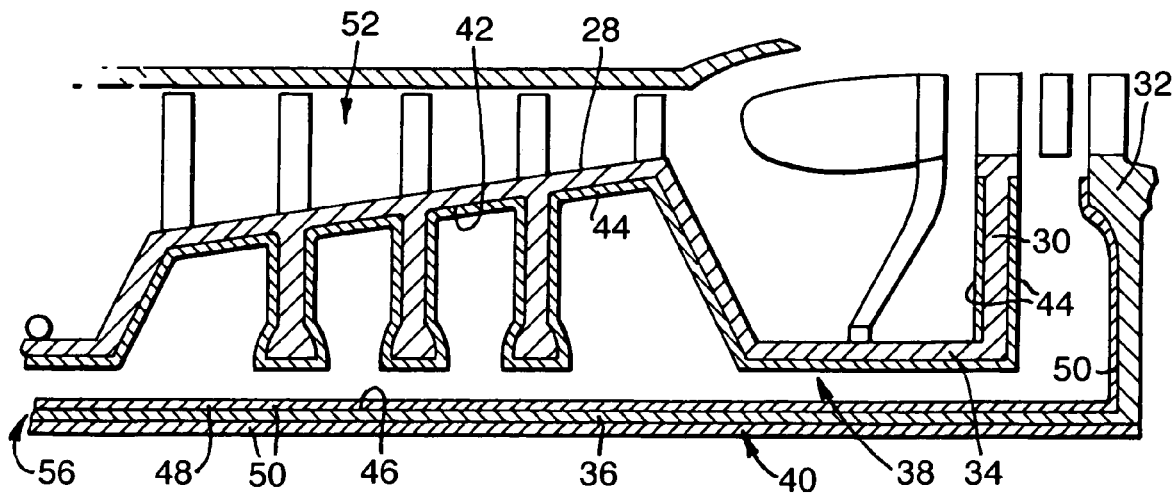
FIG. 2 is an enlarged cross-sectional view through the gas turbine engine in FIG. 1 showing rotors according to the present invention.

One arrangement of the high pressure rotor 38 and low pressure rotor 40 to reduce rotor bowing during shut down of the gas turbine engine 10 is shown in FIG. 2. The whole of the radially inner surface 42 of the high pressure rotor 38 is provided with a high emissivity surface finish 44. A portion 48 of the radially outer surface 46 of the low pressure rotor 40 is provided with a high emissivity surface finish 50, preferably the whole of the radially outer surface 46 of the low pressure rotor 40 is provided with a high emissivity surface finish 50. The radially inner surface of the low pressure rotor 40 is provided with a high emissivity surface finish 50, preferably the whole of the radially inner surface of the low pressure rotor 40 is provided with a high emissivity surface finish 50. The portion 48 of the radially outer surface 46 of the low pressure rotor 40 is aligned axially with and coaxially within the high pressure rotor 38 and the portion 48 is on the low pressure shaft 36. The inner surface 42 of the high pressure rotor 38 includes those surfaces actually facing in a radially inward direction and may include those surfaces facing in an axially upstream direction or an axially downstream direction on the individual discs making up the high pressure rotor.

A high emissivity surface finish absorbs more radiation than a low emissivity surface finish at a given level of incident radiated heat and a high emissivity surface finish emits more radiation than a low emissivity surface finish at a given temperature.

The high emissivity surface finish 44 on the high pressure rotor 38 and the high emissivity surface finish 50 on the low pressure rotor 40 increases the emissivity of these surfaces and this increases radiation heat transfer from the hotter upper portion 52 of the high pressure rotor 38 to the cooler lower portion 54 of the high pressure rotor 38 and from the hotter upper portion 56 of the low pressure rotor 40 to the cooler lower portion 58 of the low pressure rotor 40. This reduces, or minimises, the temperature difference between the upper portion 52 of the high pressure rotor 38 and the lower portion 54 of the high pressure rotor 38 and reduces, or minimises, the temperature difference between the upper portion 56 of the low pressure rotor 40 and the lower portion 58 of the low pressure rotor 40. The reduction in temperature difference will reduce the differential thermal expansion, the bowing, of the high pressure rotor 38 and the low pressure rotor 40 and will therefore reduce the amount of vibration of the high pressure rotor 38 and low pressure rotor 40, at their respective critical speeds, if the gas turbine engine 10 is restarted while the gas turbine engine 10 is cooling down.

Another advantage is that the high emissivity surface finishes 44 and 50 improve the service life of the rotor because a more uniform temperature is produced circumferentially around the high pressure rotor 38 and low pressure rotor 40. Hence the thermal expansion differences circumferentially around the rotor are reduced and hence the strains produced in the rotor, at high speeds if the gas turbine engine 10 is restarted and run up to high speeds while the gas turbine engine 10 is cooling down, are reduced.

Another arrangement of the high pressure rotor 38 to reduce rotor bowing during shut down of the gas turbine engine 10 is shown in FIG. 3. Portions 62 and 64 of the radially inner surface 42 of the high pressure rotor 38 and portions 66 of the radially outer surface 60 of the high pressure rotor 38 are provided with a low emissivity surface finish 68. A portion 72 of the radially inner surface 70 of the surrounding combustion section 18 is provided with a low emissivity surface finish 74. The portion 72 of the radially inner surface 70 of the combustion section 18 is aligned axially with and coaxially around the high pressure shaft 34 of the high pressure rotor 38.

The low emissivity surface finish 68 on the portions 62, 64 and 66 of the high pressure rotor 38 and the low emissivity surface finish 74 on the portion 72 of the radially inner surface 70 of the combustion section 18 decreases the emissivity of these surfaces and reduces radiation heat transfer axially from the hotter turbine section 20 to the cooler lower compressor section 16 of the gas turbine engine 10. This reduces, or minimises, the amount of heat transferred from the turbine section 20 to the compressor section 16 and therefore reduces, or minimises, the ability of the convection currents to create the temperature difference between the upper portion 52 of the high pressure rotor 38 and the lower portion 54 of the high pressure rotor 38. The temperature difference produced between the upper portion 52 of the high pressure rotor 38 and the lower portion 54 of the high pressure rotor 38 is reduced. The reduction in temperature difference will reduce the differential thermal expansion, the bowing, of the high pressure rotor 38 and the low pressure rotor 40 and will therefore reduce the amount of vibration of the high pressure rotor 38 and low pressure rotor 40 if the gas turbine engine 10 is restarted while the gas turbine engine 10 is cooling down.

A further arrangement of the high pressure rotor 38 to counteract the effects of rotor bowing during shut down of the gas turbine engine 10 is shown in FIG. 4. A spigotted, bolted, joint 80 for fastening two portions 82 and 84 of the high pressure rotor 38 is shown. The first portion 82, which comprises the spigot, of the high pressure rotor 38, has a radially outer surface portion 86 and a radially inner surface portion 88 provided with a high emissivity surface finish 90 and a radially inner surface portion 92 provided with a low emissivity surface finish 94. The second portion 84 of the high pressure rotor 38 has a radially outer surface portion 96 which has a low emissivity surface finish 98 and a radially inner surface portion 100 which has a high emissivity surface finish 102. The radially outer surface 104 of the low pressure shaft 36 has a high emissivity surface finish 106 and the radially inner surface 108 of the combustion section 18 has a low emissivity surface finish 110.

The high emissivity surface finish 102 on the radially inner surface portion 100 of the second portion 84 of the high pressure rotor 38 loses heat by radiation to the shaft 36 more quickly than the low emissivity surface finish 94 on the radially inner surface portion 92 of the first portion 82 of the high pressure rotor 38. The high emissivity surface finish 90 on the radially outer surface portion 86 of the first portion 82 of the high pressure rotor 38 absorbs more heat by radiation from the radially inner surface of the combustion section 18 than the low emissivity surface finish 98 of the radially outer surface portion 96 of the second portion 84 of the high pressure rotor 38 absorbs by radiation from the radially inner surface of the combustion section 18. This results in the spigot on the first portion 82 cooling at a lower rate than the second portion 84 and thus the spigot interference is maintained. The low emissivity surface finish 110 on the radially inner surface 108 of the combustion section 18 minimises radiation heat transfer from the combustion section 18 to the high pressure rotor 38. The high emissivity surface finish 106 on the radially outer surface 104 of the low pressure shaft 36 maximises radiation heat transfer from the high pressure rotor 38 to the low pressure shaft 36. The low emissivity surface finish 94 on the radially inner surface portion 92 of the first portion 82 of the high pressure rotor 38 minimises axial radiation heat transfer. The high emissivity surface finish 90 on the radially inner surface portion 88 of the first portion 82 of the high pressure rotor 38 maximises radiation heat transfer from the upper portion of the high pressure rotor 38 to the lower portion of the high pressure rotor 38.

This arrangement maintains the interference fit of the spigotted, bolted, joint 80 as the high pressure rotor 38 cools down and reduces wear of the spigotted, bolted, joint 80 due to vibration of the high pressure rotor 38 if the gas turbine engine 10 is restarted while the gas turbine engine 10 is cooling down. This arrangement therefore reduces the rate of increase in sensitivity of the spigotted, bolted, joint 80 to rotor 38 bowing over the service life of the gas turbine engine 10.

Alternatively, the inner surface portion 92 of the high pressure rotor 38 may be provided with a high emissivity surface finish rather than a low emissivity surface finish.

Figure 5:
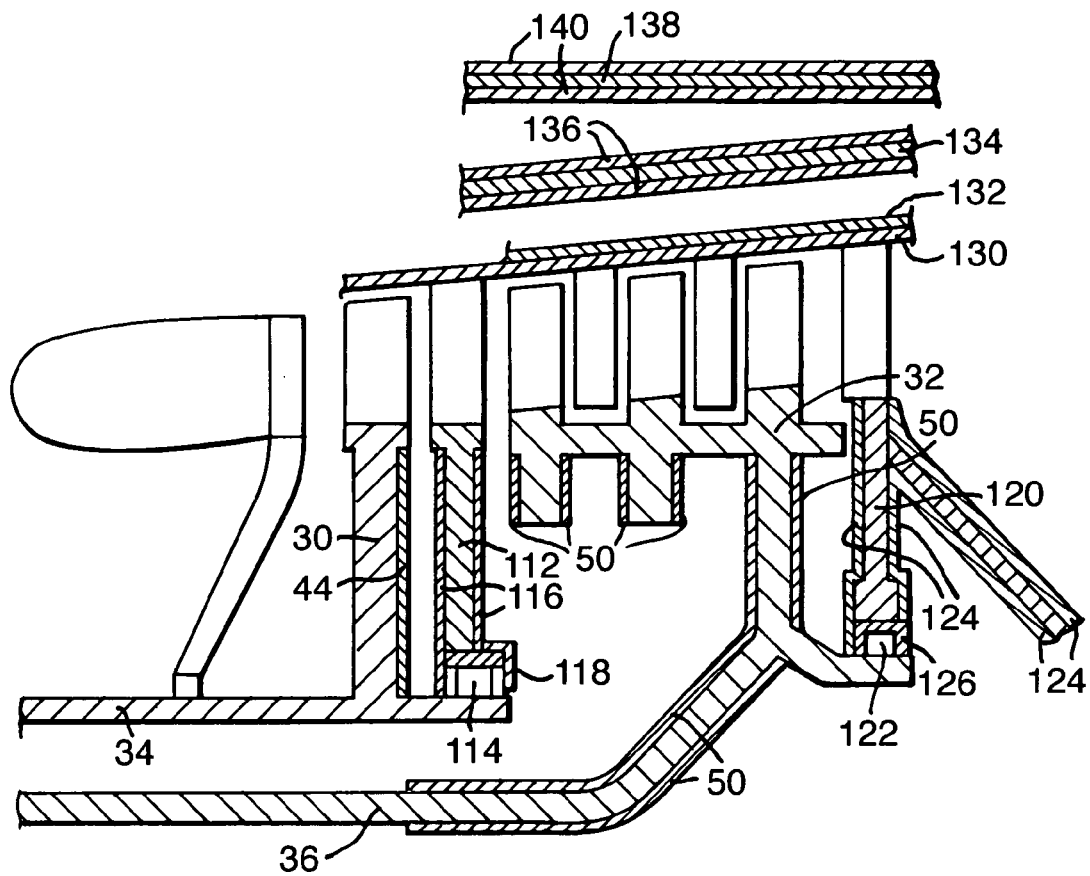
FIG. 5 is an enlarged cross-sectional view through the gas turbine engine in FIG. 1 showing further rotors according to the present invention.

In a further embodiment of the invention, as shown in FIG. 5, a high emissivity surface finish 44 is provided on the downstream surface of the high pressure turbine disc of the high pressure turbine 30 and a high emissivity surface finish 50 is provided on the upstream surface of the low pressure turbine disc of the low pressure turbine 32 and on the outer and inner surfaces of the shaft 36 downstream of the high pressure turbine 30. Additionally the upstream and downstream surfaces of a support structure 112 for the bearing chamber 114 for the high pressure rotor 38 are provided with a high emissivity surface finish 116 and the bearing chamber 114 is provided with a low emissivity surface finish 118. The upstream and downstream surfaces of a support structure 120 for the bearing chamber 122 for the low pressure rotor 40 are provided with a high emissivity surface finish 124 and the bearing chamber 122 is provided with a low emissivity surface finish 126.

In operation the high emissivity surface finish 44 on the downstream surface of the high pressure turbine 30 of the high pressure rotor 38 increases the rate of transfer of heat by radiation from the high pressure turbine 30 to the support structure 112. The high emissivity surface finish 116 on the upstream surface of the support structure 112 increases the amount of heat absorbed by the support structure 112 and the high emissivity surface finish 116 on the downstream surface of the support structure 112 increases the rate of transfer of heat by radiation to the low pressure turbine 32.

The high emissivity surface finish 50 on the upstream surface of the low pressure turbine 32 increases the amount of heat absorbed by the low pressure turbine 32 and the high emissivity surface finish 50 on the downstream surface of the low pressure turbine 32 of the low pressure rotor 40 increases the rate of transfer of heat by radiation to the support structure 120. The high emissivity surface finish 124 on the upstream surface of the support structure 120 increases the amount of heat absorbed by the support structure 120 and the high emissivity surface finish 124 on the downstream surface of the support structure 120 increases the rate of transfer of heat by radiation, conduction and convection to the outside of the gas turbine engine 10.

When the gas turbine engine 10 is shut down the quantity of heat in the turbines 30 and 32 is fixed. This arrangement reduces, or minimises, the amount of heat transferred in an axially upstream direction from the turbine section 20 to the compressor section 16 and therefore reduces, or minimises, the ability of the convection currents to create the temperature difference between the upper portion 52 of the high pressure rotor 38 and the lower portion 54 of the high pressure rotor 38. This arrangement achieves this result by increasing the amount of heat transferred in an axially downstream direction from the turbine section 20 through the exhaust.

The low emissivity surface finish 126 on the bearing chamber 122 minimises the amount of heat transferred by radiation from the turbines 30 and 32 to the bearing chamber 122 while the engine is cooling down.

Also the outer surface of the turbine casing 130 is provided with a high emissivity surface finish 132, the inner and outer surfaces of the turbine casing cooling duct 134 are provided with a high emissivity surface finish 136 and the inner and outer surfaces of the core casing 138 are provided with a high emissivity surface finish 140. In some instances a number of axially spaced hollow annular turbine casing cooling ducts are provided around the turbine casing 130, instead of the single turbine casing cooing duct 134, these are provided with a high emissivity surface finish 132 on their outer surfaces. The inner surface of the fan casing may also be provided with a high emissivity surface.

In operation the high emissivity surface finish 132 on the turbine casing 130 increases the rate of transfer of heat by radiation to the turbine casing cooling duct 134. The high emissivity surface finish 136 on the turbine casing cooling duct 134 increases the rate of transfer of heat by radiation to the core casing 138 and the high emissivity surface finish on the core casing 138 increases the rate of heat transfer by radiation, conduction and convection to the air around the core casing 138.

The temperatures of components surrounding the turbine casing 130 may vary and this may result in circumferential and axial variations in the rate of cooling of the turbine casing 130. This may result in distortions of the turbine casing 130, due to differential thermal strains, resulting in a non-circular turbine casing 130 and a bowed static structure.

The surface finishes on the turbine casing 130, turbine casing cooling duct 134 and the core casing 138 may be varied locally to compensate for these circumferential and/or axial variations in the temperature of components surrounding the turbine casing 130. These variations in the surface finish may be locally higher emissivity surface finish or locally lower emissivity surface finish to vary the rate of radiation heat transfer from the turbine casing 130, cooling duct 134 and core casing 138.

The high emissivity surface finish may comprise a coating applied to, or formed on, the surface of the rotor, casing or bearing support. The high emissivity surface finish coating may be a metal oxide, a metal oxide formed on the surface of the material of the rotor, carbon, black or other suitable colour paint or other suitable coating.

The low emissivity surface finish may comprise a polished or machined portion of the surface of the rotor or a coating applied to the surface of the rotor, bearing chamber or casing. The low emissivity surface finish coating may be a polished metal coating, for example a polished silver coating, a polished gold coating, a polished chromium coating, a polished nickel coating, or a low emissivity metal oxide or other suitable coating. The machined portion of the surface of the rotor may be a turned, milled, ground or finish produced by other suitable machining process.

Figure 6:
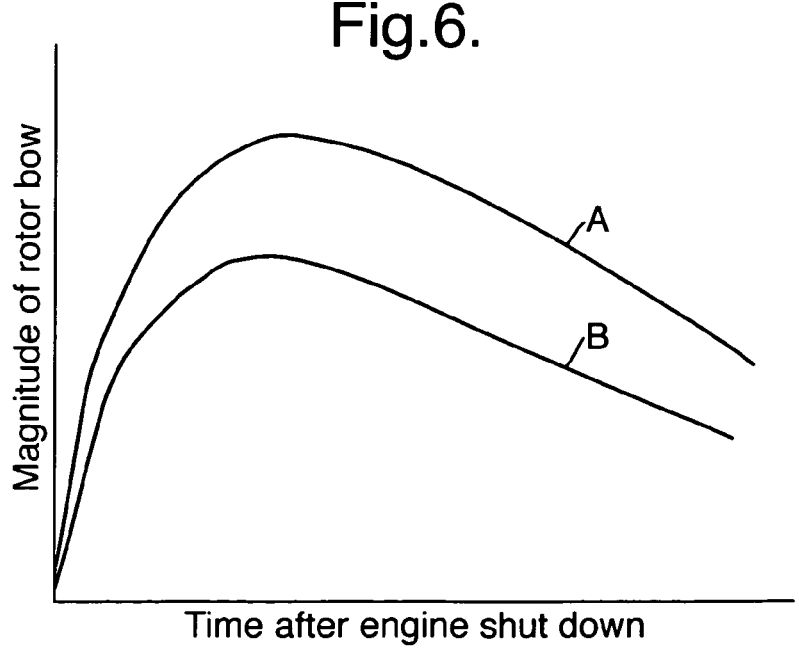
FIG. 6 is a graph showing magnitude of rotor bow against time after gas turbine engine shut down.

The magnitude of rotor bow against time after gas turbine engine shut down for a conventional two shaft gas turbine engine is shown in FIG. 6 for a gas turbine engine shut down when very hot and for a gas turbine engine shut down after cooling at low power. Line A shows the magnitude of rotor bow increasing to a peak some time after the gas turbine engine has been shut down before gradually decreasing to zero for a gas turbine engine shut down when very hot. Line B shows the magnitude of rotor bow increasing to a peak some time after the gas turbine engine has been shut down before gradually decreasing to zero for a gas turbine engine shut down after cooling at low power. It is seen that the cooling of the gas turbine engine by running at low power reduces the maximum magnitude of bowing of the rotor, possibly to just below the magnitude at which bowing of the rotor becomes critical and produces damaging vibrations.

The temperature difference between the upper portion and lower portion of a rotor test rig against time after isolation from heat source for a high emissivity coated rotor and an uncoated rotor are shown in FIG. 7. Lines C and D show the temperature difference between the upper portion and lower portion for a rotor having a high emissivity coating on its radially inner surface and lines E and F show the temperature difference between the upper portion and lower portion for an uncoated conventional rotor. It is seen that the temperature difference for the rotor with a high emissivity coating on its inner surface is about 30% lower than the uncoated rotor.

Although the invention has been described with reference to a gas turbine engine comprising two shafts it may equally well be used in a gas turbine engine comprising a single shaft or three or more shafts. In the case if a three shaft gas turbine engine the high or low emissivity surface finish may be applied to an intermediate pressure shaft arranged coaxially around the low pressure shaft and coaxially within the high pressure shaft.

It may also be possible to provide an intermediate emissivity surface finish to portions of the rotors or casings.

I claim:

1. A rotor for a gas turbine engine having a radially inner surface, a radially outer surface, an upper portion and a lower portion, said rotor having a high emissivity surface finish on a portion of its radially outer surface, said rotor having a low emissivity surface finish on a portion of its radially outer surface, said rotor having a high emissivity surface finish on a portion of its radially inner surface, said rotor having a low emissivity surface finish on a portion of its radially inner surface to reduce temperature differentials between the upper portion and the lower portion of the rotor.

2. A gas turbine engine comprising a low-pressure rotor, a high pressure rotor and at least one casing, said high pressure rotor being arranged coaxially around a low-pressure turbine, the at least one casing being arranged coaxially around said high-pressure rotor, said high-pressure rotor having a radially inner surface, a radially outer surface, an upper portion and a lower portion, said low-pressure rotor having a radially inner surface, a radially outer surface, an upper portion and a lower portion, the at least one casing having a radially inner surface and a radially outer surface, said high-pressure rotor having a high emissivity surface finish on a portion of its radially outer surface, said high-pressure rotor having a low emissivity surface finish on a portion of its radially outer surface, said high-pressure rotor having a high emissivity surface finish on a portion of its radially inner surface, said high-pressure rotor having a low emissivity surface finish on a portion of its radially inner surface to reduce temperature differentials between the upper portion and the lower portion of the high-pressure rotor.

3. A gas turbine engine as claimed in claim 2 wherein the low-pressure rotor has a high emissivity surface finish on its radially outer surface.

4. A gas turbine engine as claimed in claim 2 wherein the at least one casing has a low emissivity surface finish on its radially inner surface.

* * * * *